(12) United States Patent
Ren et al.

(10) Patent No.: US 9,924,153 B2
(45) Date of Patent: Mar. 20, 2018

(54) PARALLEL SCALING ENGINE FOR MULTI-VIEW 3DTV DISPLAY AND METHOD THEREOF

(71) Applicant: XI'AN JIAOTONG UNIVERSITY, Xi'an, Shaanxi (CN)

(72) Inventors: Pengju Ren, Shaanxi (CN); Xiaogang Wu, Shaanxi (CN); Hongwei Bi, Shaanxi (CN); Hang Wang, Shaanxi (CN); Hongbin Sun, Shaanxi (CN); Badong Chen, Shaanxi (CN); Nanning Zheng, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 64 days.

(21) Appl. No.: 14/897,076

(22) PCT Filed: May 29, 2014

(86) PCT No.: PCT/CN2014/078731
§ 371 (c)(1),
(2) Date: Dec. 9, 2015

(87) PCT Pub. No.: WO2015/161541
PCT Pub. Date: Oct. 29, 2015

(65) Prior Publication Data
US 2016/0156898 A1 Jun. 2, 2016

(30) Foreign Application Priority Data
Apr. 24, 2014 (CN) .......................... 2014 1 0167890

(51) Int. Cl.
*H04N 13/00* (2006.01)
*G06T 3/40* (2006.01)
*H04N 13/04* (2006.01)

(52) U.S. Cl.
CPC ....... *H04N 13/0055* (2013.01); *G06T 3/4007* (2013.01); *H04N 13/0011* (2013.01);
(Continued)

(58) Field of Classification Search
None
See application file for complete search history.

(56) References Cited

U.S. PATENT DOCUMENTS

2003/0223499 A1* 12/2003 Routhier ............ H04N 13/0029
375/240.25
2006/0082574 A1* 4/2006 Tsubaki ................ G09G 3/003
345/419

(Continued)

*Primary Examiner* — Frederick Bailey

(57) ABSTRACT

A parallel synchronous scaling engine for multi-view 3D display and a method thereof are provided, wherein selection and combination calculation are provided to an interpolation pixel window, then interpolation calculation is provided to a combined interpolation pixel window of a combined view field, calculation results are directly displayed on a display terminal. That is to say, interpolation is originally provided before stereoscopic pixel rearrangement, which is now improved, in such a manner that screening and combination of pixel points is provided before interpolation calculation. According to the present invention, computation and memory resource is greatly saved. The method is suitable to be implemented by hardware, for satisfying various numbers of viewpoints and interpolation algorithm, and being compatible with multi-view 3D display with the integrated and floating-point pixel arrangement, wherein the computation resource does not need to be increased with increasing of the viewpoints.

4 Claims, 4 Drawing Sheets

(52) U.S. Cl.
 CPC ..... *H04N 13/0029* (2013.01); *H04N 13/0051* (2013.01); *H04N 13/0447* (2013.01)

(56) References Cited

U.S. PATENT DOCUMENTS

| | | | |
|---|---|---|---|
| 2010/0302438 A1* | 12/2010 | Fujisawa | H04N 7/014 348/441 |
| 2011/0058021 A1* | 3/2011 | Chen | G06T 15/205 348/46 |
| 2014/0118512 A1* | 5/2014 | Park | H04N 13/0447 348/54 |
| 2015/0029317 A1* | 1/2015 | Kim | G02B 27/2214 348/59 |
| 2015/0256819 A1* | 9/2015 | Panahpour Tehrani | H04N 19/597 345/420 |

* cited by examiner

PARALLEL SCALING ENGINE FOR MULTI-VIEW 3DTV DISPLAY AND METHOD THEREOF

CROSS REFERENCE OF RELATED APPLICATION

This is a U.S. National Stage under 35 U.S.C 371 of the International Application PCT/CN2014/078731, filed May 29, 2014, which claims priority under 35 U.S.C. 119(a-d) to CN 201410167890.5, filed Apr. 24, 2014.

BACKGROUND OF THE PRESENT INVENTION

Field of Invention

The present invention relates to a technical field of video display processing, and more particularly to a multi-viewpoint parallel synchronous scaling engine of a multi-viewpoint 3D (3-dimensional) display technology which is easy to be achieved by hardware, and a method thereof.

Description of Related Arts

Stereoscopic display technology can project the appropriate perspectives of a 3D image in many directions simultaneously, viewers can get 3D stereoscopic experiences at the same time without the need for special glasses or eyes tracking, which has a bright market prospects. Conventionally, commercial 3D display technology is mostly based on the principle of human binocular stereoscopic vision, which allows the left and right eyes to receive view field images of different viewpoints. Because of the slight difference between the view field images of different viewpoints, integration thereof by brain produces a 3D sense for the audience. Compared with the conventional glasses-wear 3D display, the multi-view 3D display gets rid of the 3D glasses for receiving 3D effect, and thus with more market advantages. Conventionally, the multi-view 3D display is mainly categorized into: parallex barrier, cylindrical lens display, volume display and holographic display. Optical components are mounted above the display panel to discretize the light field into multiple narrowly spaced views to create the illusion of continuous parallax. In the present invention, the multi-view 3D display refers to the parallex barrier display and the cylindrical lens display if no specific illustration is provided.

Referring to FIG. 1, 1080P four-viewpoint 3D display with integer pixel arrangement format is provided as an example, for briefly illustrating processing procedure thereof. Four view field image resolutions of a 1080P four-viewpoint 3D source are all 960×540, and are arranged in a four-grid form. The corresponding display processing method comprises the following steps of:

1) segmenting images of four sub view fields, for obtaining four sub images (a, b, c and d) with resolutions of 960×540;

2) interpolating the resolutions of each sub image for zooming into a physical resolution (1920×1080) of a display terminal, so as to obtain zoomed images (A, B, C and D) of each sub view field;

3) according to a weighting relationship between a correlation coefficient of a parallex barrier or a cylindrical lens and the viewpoint, calculating and combining sub-pixels at positions corresponding to A, B, C and D, for obtaining display pixels of a multi-view 3D image at the corresponding positions; and 4) completing terminal display of the multi-view 3D image obtained by combining.

Referring to FIG. 2, through a corresponding optical path selection effect between the parallex barrier or the cylindrical lens and the multi-view 3D combined image, different view field images are observed from different angles and distances. Because the space between different eyes of user is about 5.5 cm, the right and left eyes will receive different views if the audience in a proper position, so as to provide 3D scene after the images are combined by the brain. It should be noticed that the four-viewpoint integrated arrangement in the FIG. 2 is only one demonstration of pixel arrangement of multi-view 3D combined image.

Referring to FIG. 3, a multi-view 3D display processing system corresponding to the above method is illustrated, which comprises: an input video decoding module, an N-viewpoint sequence generation module, a video image frame storage and control module, and a multi-view stereoscopic image generation module, wherein the multi-view stereoscopic image generation module comprises a scaling engine; interpolation pixel window of each viewpoint image is inputted into the scaling engine, and display pixels of the combined stereoscopic image are outputted.

Referring to FIG. 4, a method of the scaling engine in the conventional multi-view 3D display (N-views) system is illustrated, comprising the following steps of:

1) respectively obtaining image data of each sub view field from DRAM (comprising SDRAM, DDR2 SDRAM, and DDR3 SDRAM), according to a relevant scaling algorithm, obtaining interpolation pixel window data needed by interpolation calculation of a current interpolation pixel point of each sub view field;

2) according to coefficients of the corresponding interpolation algorithm, processing the interpolation pixel window corresponding to each view field with interpolation calculation by N interpolation modules, so as to obtain N zoomed pixel; and 3) according to the pixel arrangement requirement of a display terminal, combining pixels of N interpolation results of the N sub view fields through a multi-view 3D video image combination and calculation module, for obtaining a display pixel combining result at current position; repeating the above steps until all pixels of a frame are combined, and displaying the combined multi-view 3D images on a multi-view stereoscopic display terminal.

Referring to FIG. 3 and FIG. 4, N-viewpoint 3D display is illustrated as an example, for specifically describing the above steps:

Firstly, a video signal (analog signal or digital signal) is inputted into the input video decoding module for generating a video digital signal (RGB\YUV\RGBY signal) and corresponding synchronizing signals.

For displaying the 3D effect, a plurality of sub view field sequences should be obtained by image segmenting or 2D-3D converting with the N-viewpoint sequence generation module. Then the video image data are stored into DRAM (comprising SDRAM, DDR2 SDRAM, and DDR3 SDRAM) through the video image frame storage and control module. After the video image data are stored into the DRAM, the resolution of each sub view field image is interpolated to the physical resolution of the display terminal (such as 1080P, 4K, and 8K), and N interpolated images are with the same resolution as the display terminal are obtained. In the above process, the multi-view stereoscopic image generation module comprises the scaling engine. An operation method thereof comprises steps of: obtaining the image sequence of each sub view field from the DRAM, storing into an on-chip memory; then according to the corresponding interpolation algorithm, obtaining interpolation pixel window data needed by interpolation module calculation; providing parallel point-to-point interpolation calculation by each view interpolation module according to the interpolation algorithm and the corresponding interpolation pixel window; for the sequence of the N sub view field images obtained by interpolation module, according to 3D sub-pixel arrangement requirements of the parallax barrier or cylindrical lens of the display terminal, processing R\G\B (or Y\U\V, R\G\B\Y) sub pixel points at the corresponding positions of interpolated results of each view with the multi-view 3D video combination and calculation module, thereby obtaining display pixels of the multi-view 3D image at the corresponding positions.

Finally, according to an interface of the display terminal and a corresponding encoding method, the above multi-view 3D combined image data are sent to the display terminal, for multi-view 3D display. The above steps are repeated until all pixels of a frame are processed.

Shortcomings of the conventional methods are as follows.

With the continuous resolution upgrade of display terminal, the number of viewpoints of the multi-viewing 3D video source is increasing. As a result, view experience is improved and more users are accommodated at the same time. In the conventional methods, a series of individual scaling modules for each sub-view are instantiated, the images of each sub view need to be interpolated separately, and N view fields need N independent interpolation modules. However, during combination of multi-view 3D sub-pixel, only a part of the interpolated results of each sub view field are needed. Therefore, a plurality of interpolation modules calculates a large amount of unused redundant data, which wastes a lot of hardware calculation as well as memory resources. In addition, with the further increase of the number of viewpoints, huge hardware calculation resource consumption will finally makes it impractical.

SUMMARY OF THE PRESENT INVENTION

An object of the present invention is to provide a parallel synchronous scaling engine for multi-view 3D display and a method thereof, which is suitable to be implemented by hardware, and is able to effectively save hardware calculation resources. Referring to FIG. 3, the parallel synchronous scaling engine (shown in FIG. 5) is able to replace conventional scaling engines, so as to improve system resource utilization. The parallel synchronous scaling engine of the present invention is a key module of a multi-view 3D display system, wherein multi-view video sequence is inputted into the scaling engine, and multi-view combined stereoscopic image is outputted. With the parallel synchronous scaling engine of the present invention, hardware resource consumption of a multi-view 3D display system is greatly reduced.

Accordingly, in order to accomplish the above object, the present invention provides:

A parallel synchronous scaling engine for multi-view 3D display, comprising: a multi-channel image combining calculation module, for obtaining interpolation pixel window data, which are used during interpolation, from on-chip memory units corresponding to each sub view field, in a synchronous and parallel form; and processing the interpolation pixel window data of each sub view field with combination calculation screening, so as to obtain interpolation pixel window data of each sub pixel of a combined view field; wherein a result thereof is sent to a pixel rearrangement module; the pixel rearrangement module, for arranging the interpolation pixel window data of the sub pixels of the combined view field, so as to obtain an interpolation pixel window of the combined view field; wherein a result thereof is sent to an interpolation module; and the interpolation module, wherein according to coefficients of a corresponding interpolation algorithm, the interpolation pixel window data are interpolated for obtaining a display pixel at a corresponding position.

Preferably, during calculating the display pixels of all images in a view, a combined image is displayed on a multi-view 3D display terminal, which is real-time processed and displayed, and is easy to be achieved by hardware.

Preferably, during storing video data of each of the sub view fields into the on-chip memory units, control states of the sub view fields are kept identical, and each of sub view field data is synchronously written into the on-chip memory units.

Preferably, the multi-view 3D display terminal is an N-viewpoint multi-view 3D display terminal with integrated or floating-point pixel arrangement formats;

wherein when the multi-view 3D display terminal adopts the integrated pixel arrangement, only one $F_x^n$ equals to 1, and others equal to 0;

wherein when the multi-view 3D display terminal adopts the floating-point pixel arrangement, the $F_x^n$ satisfy $$\sum_{n=1}^{N} F_x^n = 1;$$

wherein when x sub pixel data are combined by calculation, $F_x^n$ represents a weight coefficient of an x sub pixel at a corresponding position of a number n sub view field; wherein x∈{R, G, B}, n∈{1, 2 ... N−1, N}.

A parallel synchronous interpolation method for multi-view 3D display is also provided, comprising steps of:

1) writing each of sub view field data onto corresponding on-chip memory units;

2) obtaining an interpolation pixel window of each sub view field used during interpolation, from the on-chip memory units corresponding to each sub view field, by a multi-channel image combining calculation module in a synchronous and parallel form;

3) according to a physical display resolution of a multi-view 3D display terminal and a pixel arrangement requirement, processing the interpolation pixel window data of each of the sub view fields with combination calculation by the multi-channel image combining calculation module, so as to obtain an interpolation pixel window of each sub pixel of a combined view field; and connecting the interpolation pixel window of the sub pixels of the combined view field by a pixel rearrangement module, so as to obtain an interpolation pixel window of the combined view field; and 4) according to a corresponding interpolation algorithm, providing interpolation calculation to the interpolation pixel window of the combined view field by an interpolation module, for obtaining a display pixel.

Preferably, during calculating the display pixels of all images in a view field, a combined image is displayed on a multi-view 3D display terminal, which is real-time processed and real-time displayed, and is suitable to be implemented by hardware.

Preferably, in the step 1), during storing video data of each of the sub view fields into the on-chip memory units, control states of the sub view fields are kept identical, and each of sub view field data is synchronously written into the on-chip memory units.

Preferably, the multi-view 3D display terminal is an N-viewpoint multi-view 3D display terminal with integrated or floating-point pixel arrangement;

wherein when the multi-view 3D display terminal adopts the integrated pixel arrangement, only one $F_x^n$ equals to 1, and others equal to 0;

wherein when the multi-view 3D display terminal adopts the floating-point pixel arrangement, the $F_x^n$ satisfy $$\sum_{n=1}^{N} F_x^n = 1;$$

wherein when x sub pixel data are combined by calculation, $F_x^n$ represents a weight coefficient of an x sub pixel at a corresponding position of a number n sub view field; wherein x∈{R, G, B}, n∈{1, 2 . . . N−1, N}.

A parallel synchronous interpolation method for multi-view 3D display is also provided, comprising steps of: firstly, according to the pixel arrangement requirement of a multi-view 3-dimensional display terminal, screening and combining an interpolation pixel window; abandoning redundant data, then providing interpolation calculation; and finally, directly generating display pixels of a multi-view 3D combined image.

A parallel synchronous interpolation method for multi-view 3D display is also provided, comprising steps of:

1) respectively obtaining image data of each sub view field from DRAM, according to a relevant interpolation algorithm, obtaining interpolation pixel window data needed by interpolation calculation of a current interpolation pixel point of each sub view field;

2) according to the pixel arrangement requirement of a display terminal, screening interpolation pixel window data by combining calculation with a multi-channel image combining calculation module, for obtaining interpolation pixel window data of each sub pixel of a combined view field; furthermore, through a pixel rearrangement module, obtaining an interpolation pixel window of the combined view field by arranging, wherein the interpolation pixel window is inputted into an interpolation module; and 3) according to coefficients of a corresponding interpolation algorithm, interpolating a display pixel at a corresponding position of the interpolation pixel window data obtained in the step 2) through the interpolation module, and displaying a combined multi-view stereoscopic combined image on a multi-view 3D display terminal.

Steps 1) to 3) are repeated until all pixels in a frame are processed.

Compared with the conventional technologies, advantages of the present invention are as follows.

According to the present invention, after obtaining the corresponding interpolation pixel window data of each of sub view image sequence data, interpolation is not directly provided. Actually, according to the pixel arrangement requirement of the display terminal, pixel points of each sub view field interpolation pixel window data is selected and processed with corresponding combining calculation, so as to obtain a new combined interpolation pixel window data; and then interpolation is provided. That is to say, interpolation is originally provided before stereoscopic pixel combination, which is now interchanged, in such a manner that pixel combination is accomplished before interpolation calculation. Such a result, parallel interpolation of corresponding pixels of the view is completed synchronously, which removes redundant pixels calculation. Computation complexity is 1/N of the one of conventional methods, in such a manner that calculation resource is effectively saved. The method is easy to be implemented by hardware, for satisfying various viewpoint numbers and interpolation algorithm, and being compatible with multi-view 3D display with the integrated and floating-point pixel arrangement, wherein the calculation resource does not need to be increased with increasing of the viewpoints. However, with increasing of the viewpoints, advantages of the parallel synchronous scaling engine of the present invention will be more significant.

DETAILED DESCRIPTION OF THE PREFERRED EMBODIMENT

Figure 1:
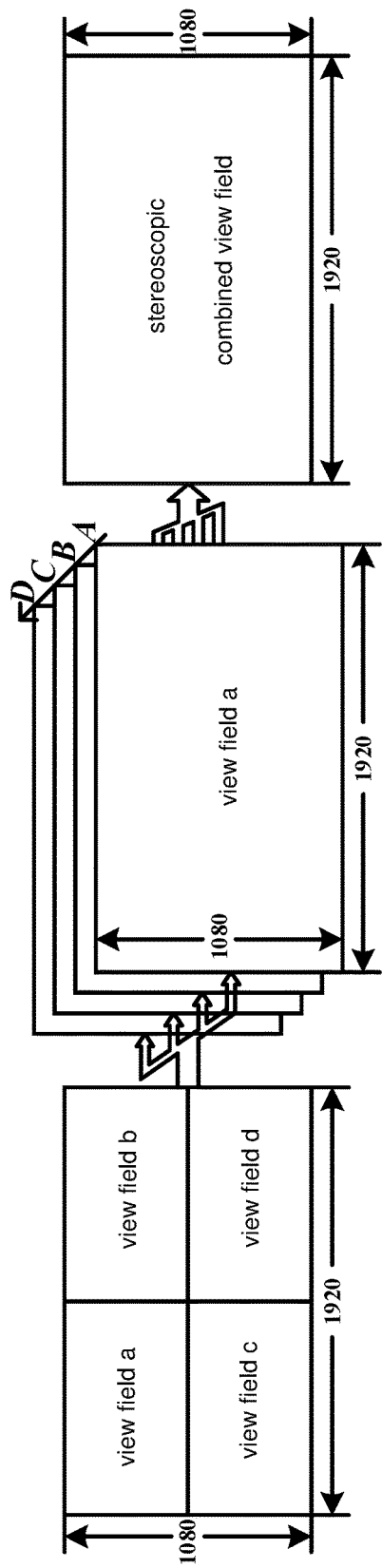
FIG. 1 is a sketch view of a conventional multi-view 3D display processing system.
Figure 2:
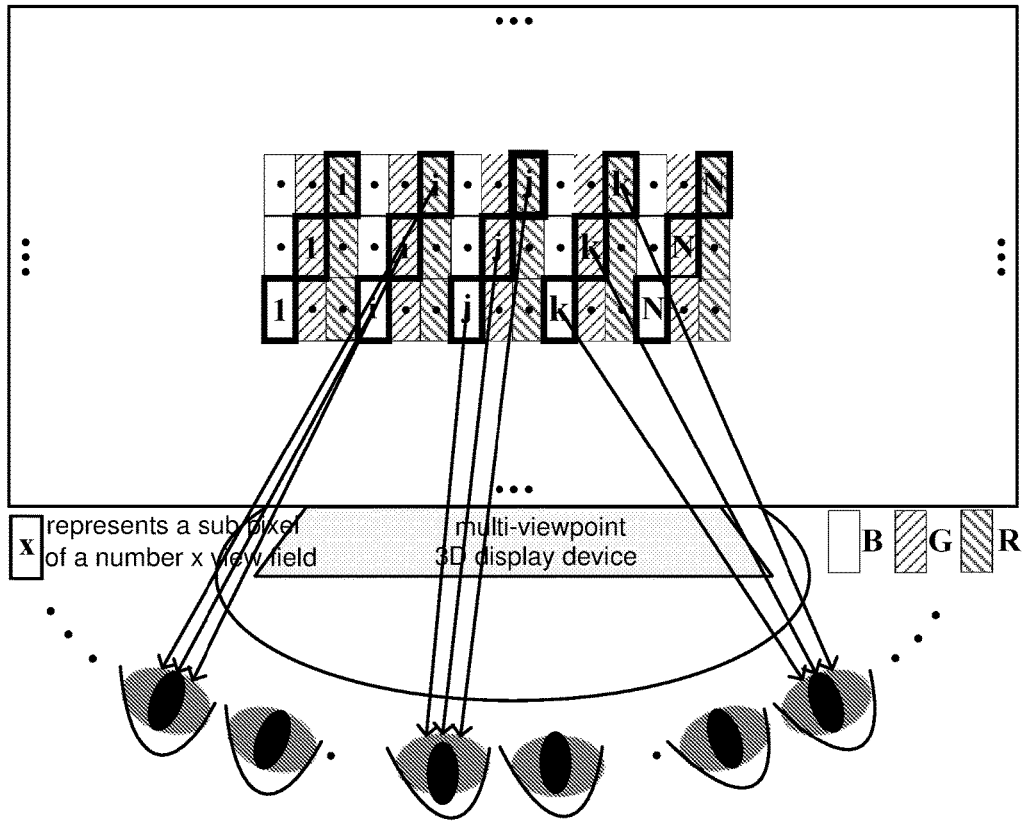
FIG. 2 illustrates display principles of the conventional multi-view 3D display processing system.
Figure 3:
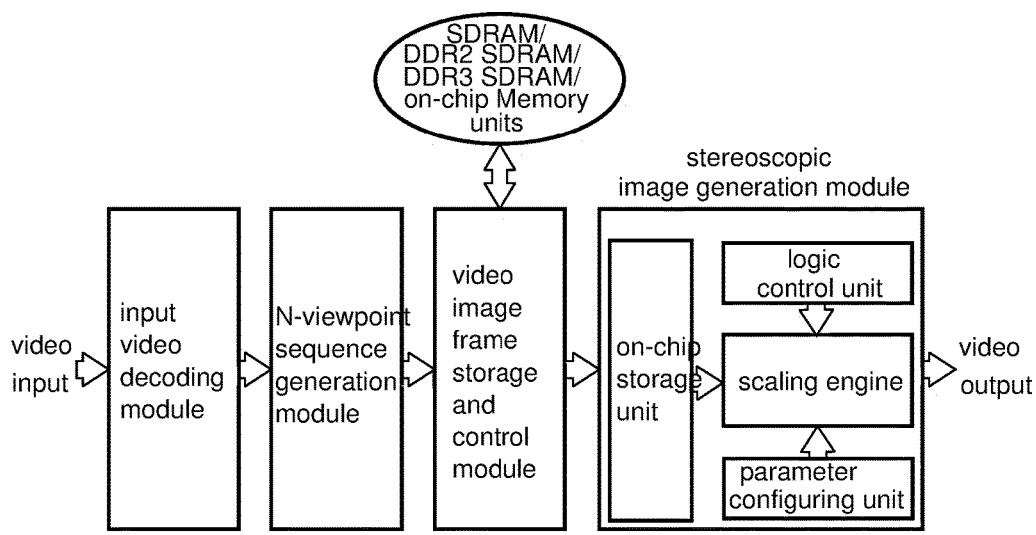
FIG. 3 illustrates a system structure of the conventional multi-view 3D display processing system.
Figure 4:
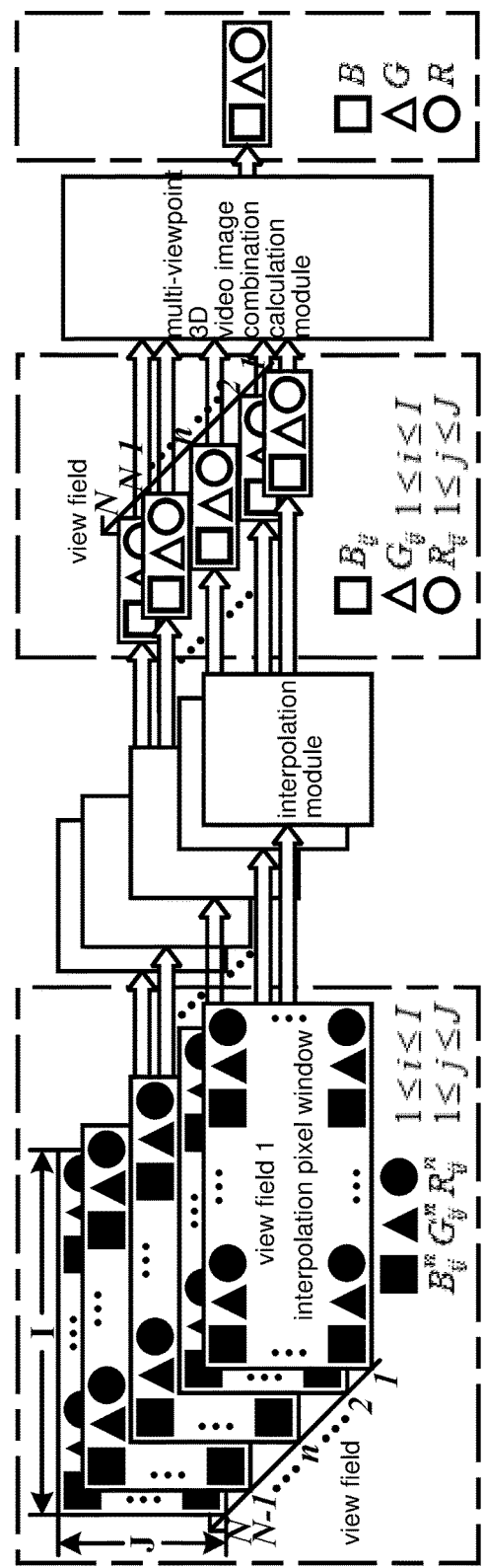
FIG. 4 is a sketch view of a scaling engine of the conventional multi-view 3D display processing system according to a conventional method.
Figure 5:
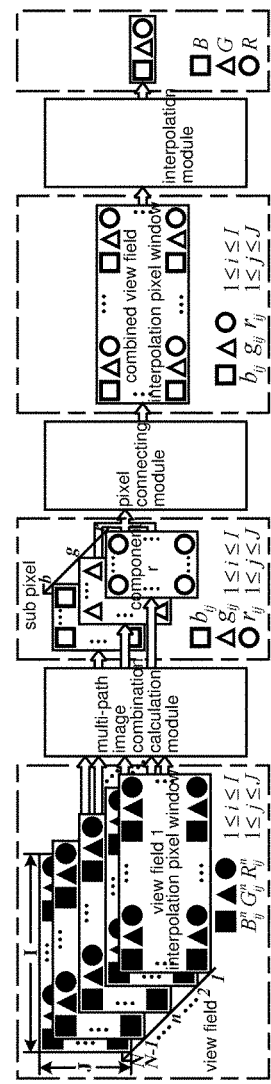
FIG. 5 is a sketch view of a parallel synchronous scaling engine for a multi-view 3D display system according to the present invention.

Referring to drawings, the present invention is further illustrated. Referring to FIG. 5, a parallel synchronous scaling engine for multi-view 3D display according to the present invention is illustrated, comprising a multi-channel image combining calculation module, a pixel rearrangement module, and an interpolation module.

The multi-channel image combining calculation module is for obtaining interpolation pixel window data, which are used during interpolation, from on-chip memory units corresponding to each sub view field, in a synchronous and parallel form; and processing the interpolation pixel window data of each sub view field with combination calculation screening, so as to obtain interpolation pixel window data of each sub pixel; wherein a result thereof is sent to a pixel rearrangement module.

The pixel rearrangement module is for connecting the interpolation pixel window data of the sub pixels of the combined view field, so as to obtain an interpolation pixel window of the combined view field; wherein a result thereof is sent to an interpolation module.

The interpolation module, according to coefficients of a corresponding interpolation algorithm, interpolates the interpolation pixel window data of a combined view field for obtaining a display pixel at a corresponding position, and displays the display pixel on a multi-view 3D display terminal.

A parallel synchronous interpolation method for multi-view 3D display comprises steps of:

1) writing each of sub view field data into corresponding on-chip memory units; 2) obtaining an interpolation pixel window of each sub view field used during interpolation, from the on-chip memory units corresponding to each sub view, by a multi-channel image combining calculation module in a synchronous and parallel form; 3) according to a physical display resolution of a multi-view 3D display terminal and a pixel arrangement requirement of a combined stereoscopic pixels, processing the interpolation pixel window data of each of the sub view fields with combination calculation by the multi-channel image combining calculation module, so as to obtain an interpolation pixel window of each sub pixel of a combined view field; and connecting the interpolation pixel window of the sub pixels of the combined view field by a pixel rearrangement module, so as to obtain an interpolation pixel window of the combined view field; and 4) according to a corresponding interpolation algorithm, providing interpolation calculation to the interpolation pixel window of the combined view field by an interpolation module, for obtaining a display pixel of a multi-view stereoscopic image.

The steps 1) to 4) are repeated until all pixels in a frame are processed, and the combined image is displayed on the multi-view 3D display terminal.

1) writing each of sub view field data into corresponding on-chip memory units:

according to the present invention, operation of each sub view field data must be provided in a parallel, synchronous, and real-time form; because the parallel synchronous scaling engine uses data of each sub view field image at a same position simultaneously, during storing video data of each of the sub view fields into the on-chip memory units, control states of the sub view fields are kept identical, and each of sub view field data is synchronously written into the on-chip memory units, thereby ensuring real-time and correct operation of following parallel synchronous interpolation.

2) obtaining an interpolation pixel window used during interpolation, from the on-chip storage units corresponding to each sub view field in a synchronous and parallel form:

in the step 2), each sub view field interpolation pixel window data must be completely consistence and synchronous; during operation, an interpolation window address calculation module is used; each sub view field uses calculation results thereof, for synchronously exporting the interpolation pixel window data to the multi-channel image combining calculation module. It should be noticed that, according to different interpolation algorithms, the interpolation window address calculation module might be different.

3) according to a physical display resolution of the display terminal and a pixel arrangement requirement, processing the interpolation pixel window data of each of the sub view fields with combination calculation by the multi-channel image combining calculation module, so as to obtain an interpolation pixel window of each sub pixel of a combined view field; and connecting the interpolation pixel window of the sub pixels of the combined view field by a pixel rearrangement module, so as to obtain an interpolation pixel window of the combined view field:

for an N-viewpoint multi-view 3D display system, after the step 2), N interpolation pixel windows are obtained; only a part of data of the N interpolation pixel windows is contributed to the finial synthesized pixel under a particular multi-view 3D display mode; before interpolation, the redundant data are dropped, for avoiding calculating the redundant data and saving calculation overheads. According to the present invention, by adjusting configuration of parameter $F_x^n$, data are selected or abandoned, so as to compatible with the multi-view 3D display terminal with the integrated and float-point pixel arrangement.

According to a preferred embodiment, a 4-viewpoint integrated pixel arrangement multi-view 3D display is described as an example, for briefly illustrating an abandoning process of the redundant data. If during final multi-view stereoscopic pixel combination, a display pixel at a certain position is obtained by combining an R sub pixel at a corresponding position of a third view field zoom result, a G sub pixel at a corresponding position of a second view field zoom result, and a B sub pixel at a corresponding position of a first view field zoom result; then during processing, only an R component of a third view field zoom window, a G component of a second view field zoom window, and a B component of a first view field zoom window are kept, and are re-combined through the pixel rearrangement module for generating a combined view field interpolation pixel window, which is inputted into the interpolation module; an interpolation result is with correct data that satisfying a display terminal requirement. According to the method, the redundant data are not calculated. According the preferred embodiment, the redundant data comprise B and G components at the corresponding position of the third view field zoom window, B and R components at the corresponding position of the second view field zoom window, G and R components at the corresponding position of the first view field zoom window, and B, G and R components of a fourth view field zoom window.

4) according to a corresponding interpolation algorithm, providing interpolation calculation by the interpolation module:

according to the interpolation method used (such as bi-cubic, bi-linear, and multi-edge detecting), an I×J interpolation pixel window is interpolated for generating one pixel point. In practice, by dynamic adjusting a size I×J of the interpolation window and configuration of parameters $P_{ij}$, the present invention is able to satisfy requirements of different interpolation algorithm.

Through the above steps, the display pixels with addresses corresponding to the display terminal are calculated. Every point is calculated with the same method until a view field of complete images is obtained by interpolation. After calculation, the display pixels are outputted to a next video encoding module. The video encoding module encodes video data according to an interface of a screen and an encoding standard, for completing normal display of the multi-view 3D image on the display terminal. Through optical component direct the light from adjacent sub-pixel columns to different viewing slot, users are able to receive comfortable multi-view stereoscopic effects.

An advantage of the present invention is to improve the conventional interpolation module, and a design of parallel synchronous scaling engine for multi-view 3D display. With the present invention, consumption of hardware computation resources of a multi-view 3D display system is greatly reduced, and the critical paths are satisfied more easily. The present invention is compatible with multi-view 3D display with various number of viewpoints, wherein the calculation resource does not need to be increased with increasing of the viewpoints. However, with increasing of the viewpoints, advantages of the parallel synchronous scaling engine of the present invention will be more significant. At the same time, the present invention is able to dynamically adjust the size of the zoom window and values of the interpolation parameter, meets the needs of different interpolation algorithm, dynamically adjusts combination method of the display pixels, and is compatible with different multi-view 3D display terminals.

The method according to the present invention is further described and illustrated as follows.

Firstly, image data of each sub view field is synchronously written into the on-chip memory units corresponding to the multi-view stereoscopic image generating module.

Multi-view image sequence of an original video is inputted into the multi-view stereoscopic image generating module, so as to output video image data corresponding to a resolution of the display terminal. According to the present invention, the parallel synchronous scaling engine for multi-view 3D display and the method thereof are provided, which complete real-time display control of the multi-view 3D combined images according to an output line-field synchronization signal, wherein each display pixel value of output data is obtained by interpolation calculation and combination permutation of each sub view field, wherein a result thereof comprises RGB\YUV\RGBY pixel components. The interpolation algorithms are slightly different from each other according to different designs and operation methods, but a basic principle thereof is: firstly, according to a position of the interpolation pixel point, determining a corresponding interpolation pixel window position used in an original video, then obtaining data in the interpolation pixel window; providing convolution calculation according to the corresponding interpolation algorithm and interpolation coefficient (such as such as bi-cubic, bi-linear, and multi-edge detecting), so as to obtain pixel data after interpolation.

For an N-viewpoint 3D display system, the conventional multi-view 3D video processing methods require N independent interpolation modules. However, according to the present invention, only 1 interpolation module is needed for achieving the above feature. Different from the conventional methods, after obtaining the corresponding interpolation pixel window data of each of sub view field image sequence data, interpolation is not directly provided. Actually, according to the pixel arrangement requirement of the display terminal, pixel points of each sub view field interpolation pixel window data is selected and processed with corresponding combining calculation, so as to obtain new combined interpolation pixel window data; and then interpolation is provided. That is to say, interpolation is originally executed before stereoscopic pixel rearrangement, these two procedures are now flipped, in such a manner that pixel rearrangement is executed before interpolation calculation. Such a result, parallel interpolation of corresponding pixels of different views is completed synchronously, which removes redundant pixel calculation. Calculation complex degree is 1/N of the conventional method, in such a manner that computation and memory resources are effectively saved.

According to the present invention, pixel data calculation formulas of the pixels at the corresponding positions of the interpolation pixel window are as follows:

$$\begin{bmatrix} r_{ij} \\ g_{ij} \\ b_{ij} \end{bmatrix} = \begin{bmatrix} F_R^1 & F_R^2 & L & F_R^N \\ F_G^1 & F_G^2 & L & F_G^N \\ F_B^1 & F_B^2 & L & F_B^N \end{bmatrix} \begin{bmatrix} R_{ij}^1 & G_{ij}^1 & B_{ij}^1 \\ R_{ij}^2 & G_{ij}^2 & B_{ij}^2 \\ M & M & M \\ R_{ij}^N & G_{ij}^N & B_{ij}^N \end{bmatrix} \quad (1)$$

then:

$$r_{ij} = \sum_{n=1}^{N} F_R^n \times R_{ij}^n \quad g_{ij} = \sum_{n=1}^{N} F_G^n \times G_{ij}^n \quad b_{ij} = \sum_{n=1}^{N} F_B^n \times B_{ij}^n \quad (2)$$

Parameter illustration for the formulas (1) and (2) are as follows:

$r_{ij}$, $g_{ij}$, and $b_{ij}$ are red, green, and blue sub pixel values calculated at a coordinate (i, j) in the interpolation pixel window of the combined view field; wherein i and j represent the coordinate (i, j) of a current pixel value in the pixel window; the parameter N represent the number of viewpoints; n presents an $n^{th}$ viewpoint; $F_x^n$ ($x \in \{R, G, B\}$, $n \in \{1, 2 \ldots N-1, N\}$) represents a weight coefficient of an x sub pixel at a corresponding position of an $n^{th}$ viewpoint when x sub pixel data are combined by calculation; $R_{ij}^n$, $G_{ij}^n$, and $B_{ij}^n$ respectively represent R, G and B data at the coordinate (i, j) of the number n sub view field. It should be notice that when integrated pixel arrangement is adopted, only one $F_x^n$ equals to 1, and others equal to 0; when floating-point pixel arrangement is adopted, there are various combination methods of N $F_x^n$ $$\left( \sum_{n=1}^{N} F_x^n = 1 \right),$$

which means the method is compatible with different multi-view 3D display terminal. According to the present invention, the N-viewpoint stereoscopic display supported comprises the integrated and the float-point pixel arrangement. During combination of the multi-view stereoscopic display pixels: for the integrated pixel arrangement, the sub pixels of the multi-view stereoscopic display pixels are represented by sub pixel values at the corresponding positions in a certain sub view field; for the float-point arrangement, the sub pixels of the multi-view stereoscopic display pixels are represented by combining the sub pixels at the corresponding positions in each sub view field.

Supposing that the interpolation algorithm calculates and obtains a pixel point according to a data window with a size of I×J, a red (R) sub pixel is described as an example, for illustrating correctness of the present invention. According to the present invention, the interpolation pixel window is firstly screened, which means pixel combination between the sub view fields in the interpolation pixel window is firstly finished, then interpolation is provided according to the calculated combination interpolation pixel window. A result thereof is as follows:

$$R = \sum_{j=1}^{J} \sum_{i=1}^{I} P_{ij} \times r_{ij} = \sum_{j=1}^{J} \sum_{i=1}^{I} \left( P_{ij} \times \left( \sum_{n=1}^{N} F_R^n \times R_{ij}^n \right) \right) = \sum_{j=1}^{J} \sum_{i=1}^{I} \sum_{n=1}^{N} P_{ij} \times F_R^n \times R_{ij}^n \quad (3)$$

Parameter illustration for the formula (3) is as follows:
R represents a calculation result of the red sub pixel of the I×J interpolation pixel window. The parameters I and J represent that a size of the interpolation pixel window is: I pixels in a horizontal direction, and J pixels in a vertical direction; i and j represent a coordinate (i, j) in the interpolation pixel window; $P_{ij}$ is a coefficient, i.e. interpolation weighting coefficient corresponding to the coordinate (i, j); $r_{ij}$ is a red pixel value at the coordinate (i, j) in the interpolation pixel window; $F_R^n$ is a permutation combination weighting coefficient corresponding to the red pixels in a number n sub view during calculating an R pixel; $R_{ij}^n$ is a red sub pixel value at the coordinate (i, j) when the number n sub view field is not interpolated and combined.

According to a conventional method, interpolation calculation is firstly provided to each sub view field, so as to obtain interpolation results; then according to the interpolation results of the sub view fields, a multi-view stereoscopic image is combined, wherein a final interpolation result is as follows:

$$R = \sum_{n=1}^{N} F_R^n \sum_{j=1}^{J} \sum_{i=1}^{I} P_{ij} \times R_{ij}^n = \sum_{j=1}^{J} \sum_{i=1}^{I} \sum_{n=1}^{N} P_{ij} \times F_R^n \times R_{ij}^n \quad (4)$$

Comparing the formula (3) with the formula (4), it can be concluded that results of the present invention and the conventional method are completely the same. However, by using the present invention, interpolation processes are reduced by N−1 times during calculation of each pixel point, so as to greatly reduce computation and memory resource consumption.

What is claimed is:

1. A multi-view 3D display device with a parallel synchronous scaling engine, comprising:

a multi-channel image combining calculation module, for obtaining interpolation pixel window data, which are used during interpolation, from on-chip memory units corresponding to each sub view field, in a synchronous and parallel form; and processing the interpolation pixel window data of each sub view field with combination calculation screening, so as to obtain interpolation pixel window data of each sub pixel of a combined view field; wherein a result thereof is sent to a pixel rearrangement module;

the pixel rearrangement module, for generating the interpolation pixel window data of the sub pixels of the combined view field, so as to obtain an interpolation pixel window of the combined view field; wherein a result thereof is sent to an interpolation module;

the interpolation module, wherein according to coefficients of a corresponding interpolation algorithm, the interpolation pixel window data are interpolated for obtaining a display pixel at a corresponding position; and a multi-view 3D display terminal, wherein the interpolation module calculates all the display pixels of all images in a view field, and displays a combined image on the multi-view 3D display terminal;

wherein the multi-view 3D display terminal is an N-viewpoint multi-view 3D display terminal with integrated or floating-point pixel arrangement;

wherein when the multi-view 3D display terminal adopts the integrated pixel arrangement, only one $F_x^n$ equals to 1, and others equal to 0;

wherein when the multi-view 3D display terminal adopts the floating-point pixel arrangement, the $F_x^n$ satisfy $$\sum_{n=1}^{N} F_x^n = 1;$$

wherein when x sub pixel data are combined by calculation, $F_x^n$ represents a weight coefficient of an x sub pixel at a corresponding position of a number n sub view field; wherein x∈{R, G, B}, n∈{1, 2 . . . N−1, N}.

2. A parallel synchronous interpolation method for multi-view 3D display, comprising steps of:

1) writing each of sub view field data into corresponding on-chip memory units;

2) obtaining an interpolation pixel window of each sub view field used during interpolation, from the on-chip memory units corresponding to each sub view field, by a multi-channel image combining calculation module in a synchronous and Parallel form;

3) according to a physical display resolution of a multi-view 3D display terminal and a pixel arrangement requirement of a combined stereoscopic image, processing the interpolation pixel window data of each of the sub view fields with combination calculation by the multi-channel image combining calculation module, so as to obtain an interpolation pixel window of each sub pixel of a combined view field; and connecting the interpolation pixel window of the sub pixels of the combined view field by a pixel rearrangement module, so as to obtain an interpolation pixel window of the combined view field; and 4) according to a corresponding interpolation algorithm, providing interpolation calculation to the interpolation pixel window of the combined view field by an interpolation module, for obtaining a display pixel;

wherein the interpolation module calculates all the display pixels of all images in a view field, and real-time displays the pixels of a combined image on the multi-view 3D display terminal.

3. The parallel synchronous interpolation method, as recited in claim 2, wherein in the step 1), during storing video data of each of the sub view fields into the on-chip memory units, control states of the sub view fields are kept identical, and each of sub view field data is synchronously written into the on-chip memory units.

4. The parallel synchronous interpolation method, as recited in claim 2, wherein the multi-view 3D display terminal is an N-viewpoint multi-view 3D display terminal with integrated or floating-point pixel arrangement;

wherein when the multi-view 3D display terminal adopts the integrated pixel arrangement, there is only one $F_x^n$ equaling to 1, and others equal to 0;

wherein when the multi-view 3D display terminal adopts the floating-point pixel arrangement, the $F_x^n$ satisfy $$\sum_{n=1}^{N} F_x^n = 1;$$

wherein when x sub pixel data are combined by calculation, $F_x^n$ represents a weight coefficient of an x sub pixel at a corresponding position of a number n sub view field; wherein x∈{R, G, B}, n∈{1, 2 . . . N−1, N}.

* * * * *